(12) United States Patent
Proksa

(10) Patent No.: US 9,857,479 B2
(45) Date of Patent: *Jan. 2, 2018

(54) ADAPTIVE PERSISTENT CURRENT COMPENSATION FOR PHOTON COUNTING DETECTORS

(71) Applicant: KONINKLIJKE PHILIPS N.V., Eindhoven (NL)

(72) Inventor: Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 72 days.

This patent is subject to a terminal disclaimer.

(21) Appl. No.: 15/041,100

(22) Filed: Feb. 11, 2016

(65) Prior Publication Data

US 2016/0170039 A1 Jun. 16, 2016

Related U.S. Application Data

(63) Continuation of application No. 14/363,451, filed as application No. PCT/IB2012/057211 on Dec. 12, 2012, now Pat. No. 9,291,724.

(51) Int. Cl.
*G01T 1/24* (2006.01)
*G01T 1/17* (2006.01)

(52) U.S. Cl.
CPC .............. *G01T 1/17* (2013.01); *G01T 1/24* (2013.01); *G01T 1/247* (2013.01); *G01T 1/249* (2013.01)

(58) Field of Classification Search
CPC .. G01T 1/24; G01T 1/17; G01T 1/247; G01T 1/249; G01T 1/171

(Continued)

(56) References Cited

U.S. PATENT DOCUMENTS 4,893,018 A * 1/1990 Saitou .................... G01T 7/005
250/370.01
5,703,369 A * 12/1997 Mori ..................... G01T 1/1611
250/363.03

(Continued)

FOREIGN PATENT DOCUMENTS

| CN | 2793721 | 7/2006 |
|---|---|---|
| WO | 2008013663 | 1/2008 |
| WO | 2008038177 | 4/2008 |

OTHER PUBLICATIONS

Kraft, et al., "Counting and Integrating Readout for Direct Conversion X-Ray Imaging: Concept, Realization and First Prototype Measurements", IEEE Transactions on Nuclear Science, vol. 54, No. 2, Apr. 2007, pp. 383-390.

*Primary Examiner* — Taeho Jo

(57) ABSTRACT

An imaging system (100) includes a direct conversion detector pixel (111) that detects radiation traversing an examination region and generates an electrical signal indicative thereof, wherein the signal includes a persistent current, which is produced by a direct conversion material of the pixel and which shifts a level of the signal. A persistent current estimator (116) estimates the persistent current and generates a compensation signal based on the estimate. A pre-amplifier (112) receives the signal and the compensation signal, wherein the compensation signal substantially cancels the persistent current, producing a persistent current compensated signal, and that amplifies the compensated signal, generating an amplified compensated signal. A shaper (114) generates a pulse indicative of energy of the radiation illuminating the direct conversion material based on the amplified compensated signal.

20 Claims, 4 Drawing Sheets

Figure 1:
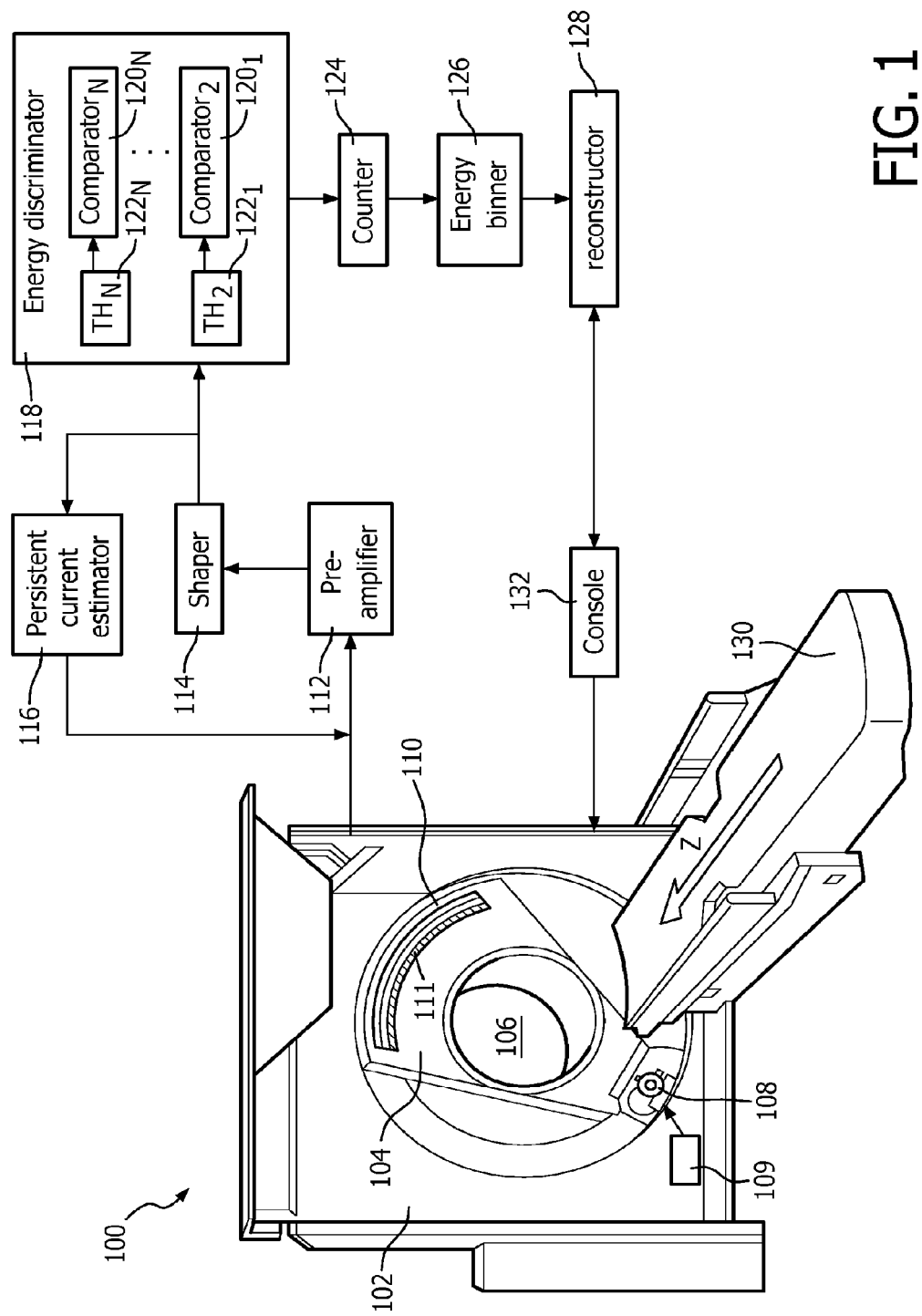

(58) Field of Classification Search
USPC .................................................. 250/370.08
See application file for complete search history.

(56) References Cited

U.S. PATENT DOCUMENTS

| | | | | |
|---|---|---|---|---|
| 6,148,057 | A * | 11/2000 | Urchuk | A61B 6/583 378/18 |
| 6,931,098 | B2 * | 8/2005 | Kump | A61B 6/405 348/E5.081 |
| 7,260,171 | B1 * | 8/2007 | Arenson | A61B 6/032 378/16 |
| 7,383,142 | B2 | 6/2008 | Scoullar | |
| 7,592,596 | B2 | 9/2009 | Klein | |
| 7,615,753 | B2 | 11/2009 | Audebert | |
| 7,872,221 | B2 * | 1/2011 | Blevis | G01T 1/249 250/252.1 |
| 2003/0075685 | A1 * | 4/2003 | Yamakawa | G01T 1/2928 250/370.11 |
| 2004/0017224 | A1 | 1/2004 | Tumer | |
| 2007/0228267 | A1 * | 10/2007 | Yokoi | G01T 1/1644 250/252.1 |
| 2008/0023638 | A1 * | 1/2008 | Starman | G01T 1/2018 250/371 |
| 2008/0260094 | A1 * | 10/2008 | Carmi | A61B 6/032 378/19 |
| 2009/0016482 | A1 * | 1/2009 | Shechter | A61B 6/032 378/4 |
| 2009/0194703 | A1 * | 8/2009 | Eversmann | G01T 1/17 250/395 |
| 2009/0309031 | A1 * | 12/2009 | Ohtani | G01T 1/2985 250/363.03 |
| 2010/0027738 | A1 * | 2/2010 | Carmi | G01T 1/2985 378/19 |
| 2010/0193700 | A1 * | 8/2010 | Herrmann | G01T 1/171 250/395 |
| 2010/0215230 | A1 * | 8/2010 | Bornefalk | G06T 11/005 382/128 |
| 2010/0320391 | A1 | 12/2010 | Antonuk | |
| 2011/0096905 | A1 * | 4/2011 | Roessl | A61B 5/4869 378/62 |
| 2011/0253886 | A1 | 10/2011 | Hackenschmied | |
| 2012/0001084 | A1 * | 1/2012 | Proksa | A61B 6/032 250/393 |
| 2012/0032085 | A1 | 2/2012 | Baeumer | |
| 2012/0087463 | A1 * | 4/2012 | Greenberg | G01T 7/005 378/5 |
| 2013/0010917 | A1 * | 1/2013 | Thibault | G06T 11/006 378/4 |
| 2013/0044248 | A1 * | 2/2013 | Tumer | H03F 3/087 348/302 |
| 2013/0110438 | A1 * | 5/2013 | Rinkel | G01N 23/087 702/85 |
| 2013/0308847 | A1 * | 11/2013 | Schirra | G06T 11/005 382/131 |
| 2014/0254749 | A1 * | 9/2014 | Steadman Booker | G01T 1/24 378/19 |
| 2014/0306116 | A1 * | 10/2014 | Roessl | G01T 1/20 250/362 |
| 2014/0328465 | A1 | 11/2014 | Herrmann | |
| 2015/0117594 | A1 * | 4/2015 | Pavlovich | A61B 6/032 378/5 |

* cited by examiner

ADAPTIVE PERSISTENT CURRENT COMPENSATION FOR PHOTON COUNTING DETECTORS

CROSS REFERENCE TO RELATED APPLICATIONS

This application is a continuation of application Ser. No. 14/363,451, filed Jun. 6, 2014, which is a national filing of PCT application Serial No. PCT/IB2012/057211, filed Dec. 12, 2012, published as WO 2014/091278 on Jun. 19, 2014, which is incorporated herein by reference.

The following generally relates to photon counting detectors and more particularly to compensating for photon counting detector material induced persistent current, and is described with particular application to computed tomography (CT); however, the following is also amenable to other imaging modalities such as X-ray and/or other imaging modality.

A computed tomography (CT) scanner generally includes a rotating gantry rotatably mounted to a stationary gantry. The rotating gantry supports an X-ray tube and is configured to rotate around an examination region about a longitudinal axis. A detector array is located opposite the X-ray tube, across the examination region. The X-ray tube is configured to emit poly-energetic ionizing radiation that traverses the examination region (and a portion of an object or subject therein) and illuminates the detector array. The detector array includes a one or two dimensional array of detector pixels that detect the radiation and that generate signals indicative thereof. Each pixel is associated with a readout channel, which is used to convey a corresponding signal for further processing. A reconstructor reconstructs the processed signals, producing volumetric image data indicative of the examination region.

For spectral CT, the detector pixels have included direct conversion detector pixels. Generally, a direct conversion pixel includes a direct conversion material (e.g., cadmium telluride (CdTe), cadmium zinc telluride (CZT) etc.) disposed between a cathode and an anode, with a voltage applied across the cathode and the anode. X-ray photons illuminate the cathode, transferring energy to electrons in the direct conversion material, which creates electron/hole pairs, with the electrons drifting towards the anode. The anode, in response, produces the electrical signal output by the detector array. An amplifier amplifies the electrical signal, and a pulse shaper processes the amplified electrical signal and produces a pulse having a peak amplitude or height that is indicative of the energy of the detected radiation. An energy discriminator compares the height of the pulse with one or more energy thresholds. For each threshold, a counter counts the number of times the pulse height crosses the threshold. An energy-binner bins the counts in energy-ranges, thereby energy-resolving the detected radiation. The reconstructor reconstructs the binned signals using a spectral reconstruction algorithm Direct conversion material such as CdTe and CZT tends to produce a low frequency electrical current when irradiated with X-rays, which results in a baseline shift of the signals output by the detector pixels. Unfortunately, the baseline shift shifts the pulse output by the shaper, which can lead to erroneous binning of the detected radiation into incorrect energy bins as the discriminator thresholds remain static. There are two main components of this low frequency electrical current; namely, dark current and persistent current. The dark current is a DC component that depends on the detector material and the bias voltage and usually does not change during an acquisition interval. This component can simply be corrected with a static bias compensation, which injects the same amount of current with the opposite sign to the input of the amplifier. The persistent current is caused by trapping (in the direct conversion material) of holes of the electron-hole pairs. Because of the positive potential of the trapped charges, electrons are injected into the bulk material and move to the anode instead of recombining with the holes. The resulting slowly varying current can be very strong and can exceed the photo current (the amount of charge directly generated by photons) by two orders of magnitude. Unfortunately, the persistent current dynamically changes and cannot simply be compensated with a static single of the opposite sign like the dark current.

Aspects described herein addresses the above-referenced problems and others.

In one aspect, an imaging system includes a direct conversion detector pixel that detects radiation traversing an examination region and generates an electrical signal indicative thereof. The generated electrical signal includes a persistent current, which is produced by a direct conversion material of the direct conversion detector and which shifts a level of the electrical signal. The imaging system further includes a persistent current estimator that estimates the persistent current produced by the direct conversion material and generates a persistent current compensation signal based on the estimate. The imaging system further includes a pre-amplifier that receives the electrical signal output by the direct conversion detector pixel and the persistent current compensation signal. The persistent current compensation signal substantially cancels the persistent current produced by the direct conversion material, producing a persistent current compensated signal. The pre-amplifier also amplifies the persistent current compensated signal, generating an amplified persistent current compensated signal. The imaging system further includes a shaper that generates an electrical pulse indicative of an energy level of the radiation illuminating the direct conversion material based on the amplified persistent current compensated signal.

In another aspect, a method includes generating a persistent current compensation signal based on a model of a behavior of a direct conversion material of a photon counting detector pixel. The model models a generation of trapped holes in the direct conversion material and a trapped hole recombination rate of the direct conversion material. The method further includes injecting the persistent current compensation signal at an input of a pre-amplifier which receives and amplifies an electrical signal generated by the photon counting detector pixel in response to radiation illuminating the photon counting detector pixel.

In another aspect, a persistent current estimator, which estimates a persistent current produced by a direct conversion material of a photon counting detector pixel, includes a first resistive element, having a first resistive value indicative of a generation of trapped holes in the direct conversion material, that generates a first output signal, and an integrator, including a feedback resistive element having a second resistive value indicative of the trapped hole recombination rate of the direct conversion material, that receives and processes the first output signal, generating a persistent current compensation signal corresponding to the persistent current produced by a direct conversion material.

The invention may take form in various components and arrangements of components, and in various steps and arrangements of steps. The drawings are only for purposes of illustrating the preferred embodiments and are not to be construed as limiting the invention.

FIG. 1 schematically illustrates an imaging system in connection with a persistent current estimator.

Figure 2:
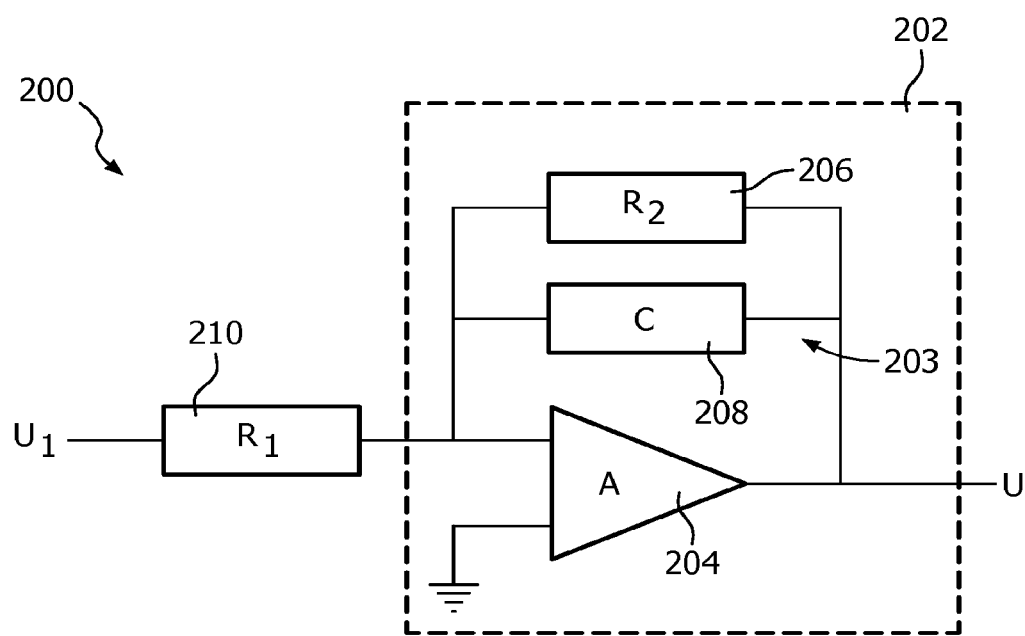

FIG. 2 schematically illustrates a non-limiting model of persistent current.

Figure 3:
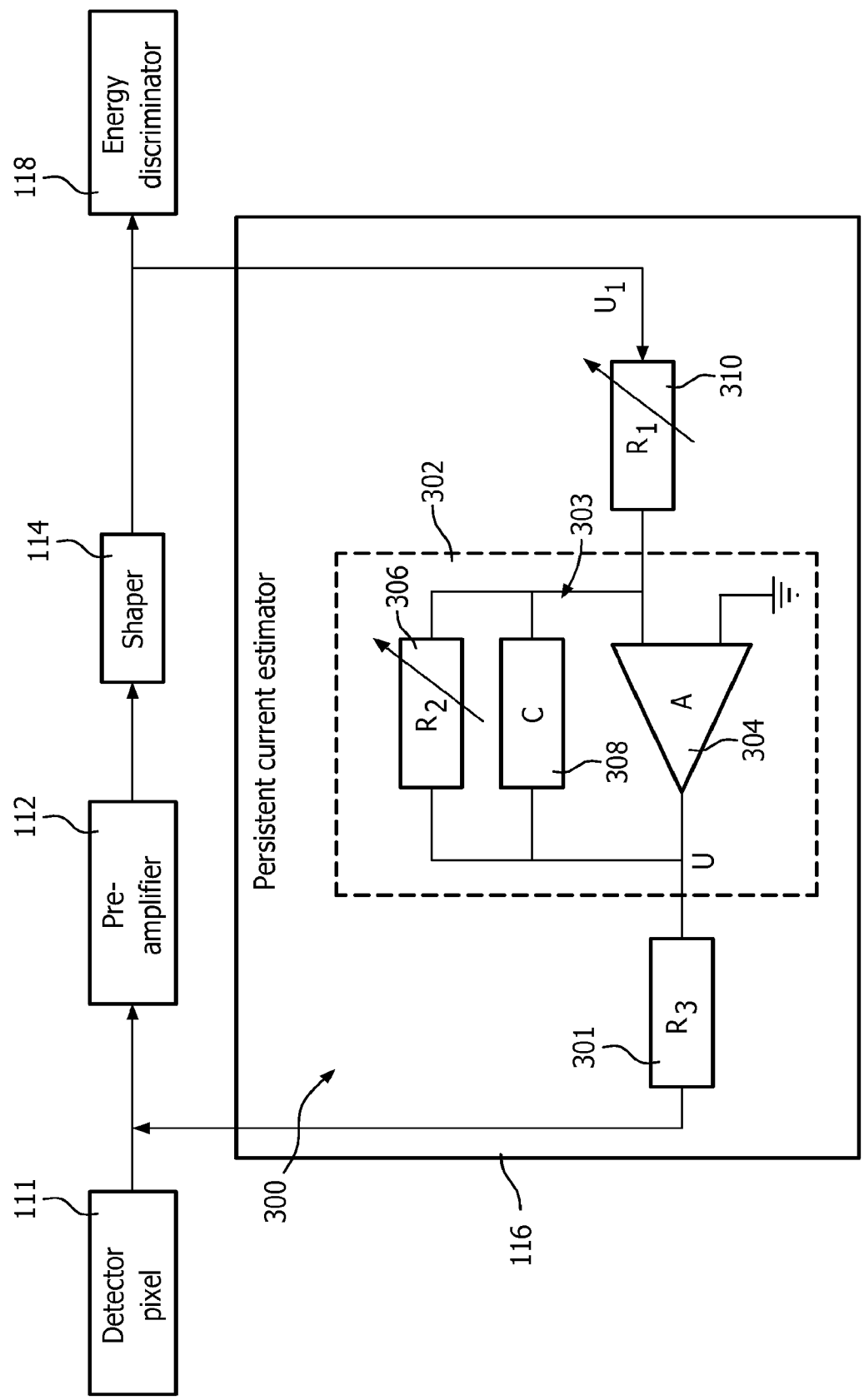

FIG. 3 schematically illustrates a non-limiting electrical circuit based implementation of the persistent current model of FIG. 2.

Figure 4:
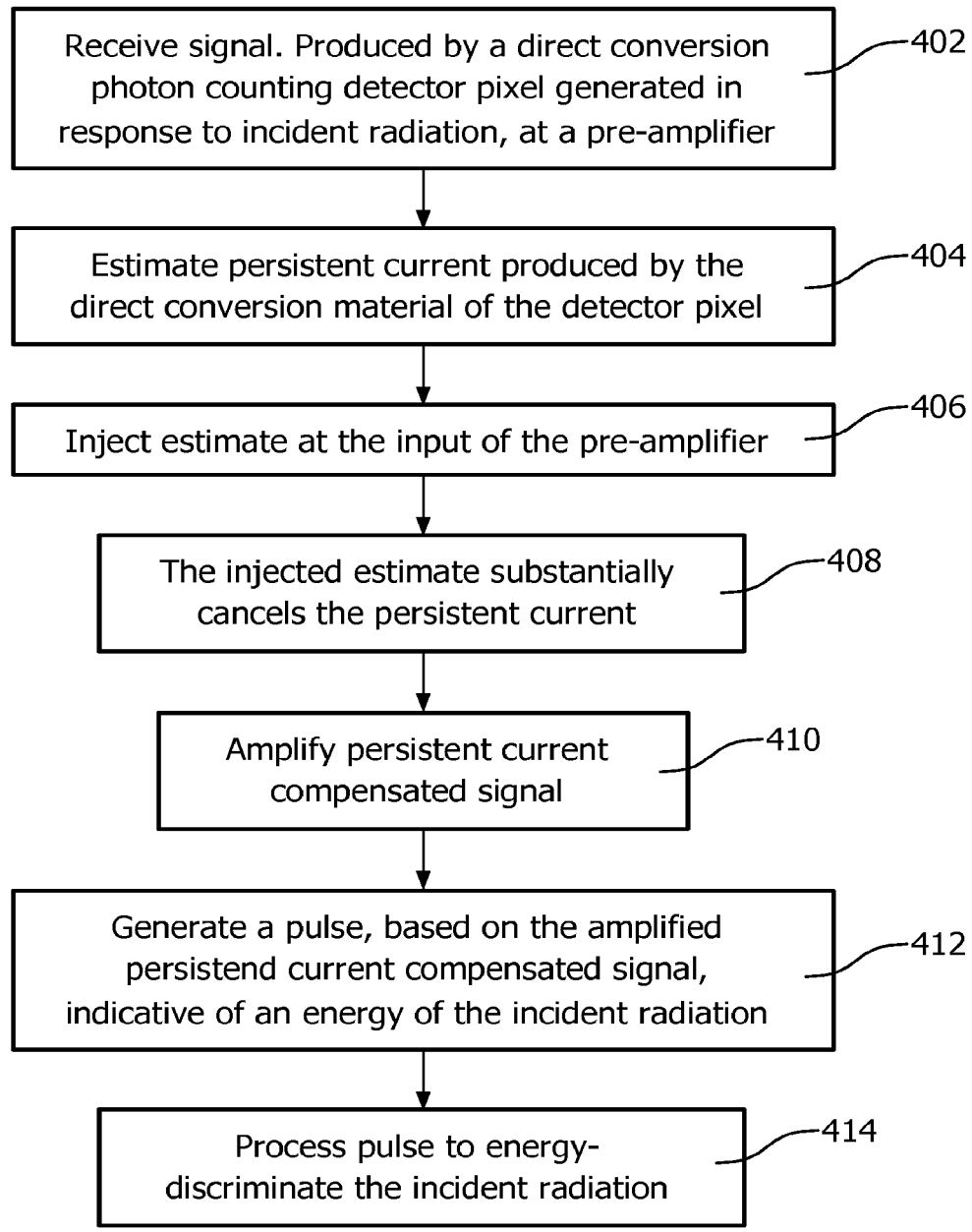

FIG. 4 illustrates a method for compensating for persistent current.

As discussed above, direct conversion material of an imaging system photon counting detector tends to produce a low frequency electrical current (i.e., a persistent current) when irradiated with X-rays which can lead to erroneous binning of the detected radiation. Described herein is an approach to estimating the persistent current and using the estimate to compensate for the persistent current during data acquisition, thereby mitigating erroneous binning of the detected radiation due to persistent current.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a z-axis.

A radiation source 108, such as an X-ray tube, is supported by and rotates with the rotating gantry 104 around the examination region 106 about the z-axis. The source 108 emits radiation that traverses the examination region 106. An optional radiation controller 109 transitions a state of radiation emission between a first state in which radiation traverses the examination region 106 and a second state in which radiation does not traverse the examination region 106. This may include turning the source 108 "on"/"off," inserting/removing a filter from the path of radiation, applying/removing a grid voltage to a switching grid of the source 108 to inhibit/allow electrons to flow from the cathode to the anode of the source 108, etc.

A radiation sensitive detector array 110 subtends an angular arc across the examination region 106 opposite the radiation source 108. The detector array 110 detects radiation that traverses the examination region 106 and generates an electrical (e.g., a voltage or current) signal indicative thereof. The illustrated detector array 110 includes one or more rows of photon counting detector pixels 111 such as direct conversion detector pixels including a direct conversion crystal or material (e.g., CdTe, CZT, etc.). For each of the detector pixels 111, an optional pre-amplifier 112 amplifies the electrical signal, and a pulse shaper 114 receives the electrical signal or amplified signal and generates a pulse (e.g., voltage or current) having a peak height or amplitude that is indicative of the energy level of the corresponding incident detected radiation.

A persistent current estimator 116 estimates, for each detector pixel 111, a value of the persistent current at the output of the corresponding shaper 114 and generates a persistent current compensation signal for each detector pixel 111. For a detector pixel 111, the estimator 116 feeds or injects the compensation signal back to the input of the corresponding pre-amplifier 112, which substantially cancels the persistent current of that detector pixel 111 at the input of the pre-amplifier 112. This may substantially mitigate the baseline shift at the output of the shaper 114 of a detector pixel 111 due to the persistent current of that detector pixel 111. As described in greater detail below, in one instance, the persistent current estimator 116 includes electrical circuitry corresponding to a mathematical model that describes the behavior of the direct conversion material of the detector pixel 111 with respect to persistent current.

An energy-discriminator 118 energy-discriminates the pulse output by the shaper 114 for each detector pixel 111. The illustrated energy-discriminator 118 includes a set of comparators $120_1, \ldots, 120_N$ (collectively referred to herein as comparators 120) and a corresponding set of predetermined energy thresholds (TH) $122_1, \ldots 122_N$ (collectively referred to herein as energy thresholds 122), where N is an integer equal to or greater than one. Each of the comparators 120 compares the height of an incoming pulse with its respective one of the thresholds 122 and generates an output signal that indicates whether the peak height exceeded that threshold 122.

A counter 124 counts, for each of the comparators 120, when an individual threshold is exceeded by a peak of a pulse, for each of the plurality of pulses. An energy-binner 126 bins the counts into energy ranges based on a relationship between the threshold levels and the energy of incoming radiation, thereby energy-resolving the detected radiation. A reconstructor 128 reconstructs the energy-binned signals. The reconstructor 128 can employ a spectral and/or a non-spectral reconstruction algorithm to reconstruct the energy-binned signals.

A subject support 130, such as a couch, supports an object or subject in the examination region 106. The subject support 130 can be used to vertically and/or horizontally position the subject or object relative to the imaging system 100 before, during, and/or after scanning A general purpose computing system serves as an operator console 132 and includes an output device such as a display and an input device such as a keyboard, mouse, and/or the like. Software resident on the console 132 allows the operator to interact and/or operate the imaging system 100. Such interaction may include selecting an imaging protocol with or without grid switching, initiating scanning, etc.

As discussed above, the persistent current estimator 116 can be implemented through electrical circuitry corresponding to a model of the behavior of the direct conversion material of the detector pixels 111 with respect to persistent current induced by the direct conversion material. The following provides a non-limiting example of a mathematical model and example electrical circuitry based thereon.

For this example, persistent current can be modeled as shown in EQUATION 1:

$$I_p(t) = \frac{eN^{T+}(t)}{T_{DRIFT}}, \quad \text{EQUATION 1}$$

where $I_p(t)$ represents the persistent current, e represents the elementary charge, $N^{T+}(t)$ represents the number of trapped holes, and $T_{DRIFT}$ represents the drift time of electrons from the cathode to the anode of the source 108. The generation of trapped holes is proportional to the photo current and the holes have a lifetime of t, and the number of holes can be approximated by the differential equation shown in EQUATION 2:

$$\frac{dN^{T+}}{dt} = \alpha N^-(t) - \beta N^{T+}(t), \quad \text{EQUATION 2}$$

where α represents a constant that approximates the number of trapped holes per generated photo electron, and β represents a constant that describes the trapped holes recombination rate. Both α and β are direct conversion material specific constants.

FIG. 2 shows an example electrical circuit model 200 based on a differential equation structurally similar to the differential equation of EQUATION 2.

The electrical circuit model 200 includes an analogue integrator 202, which includes an amplifier 204, a first resistive element ($R_1$) 210, which models the generation of trapped holes, and a feedback circuit 203 with a second resistive element ($R_2$) 206, which models the trapped hole recombination rate, electrically in parallel with a capacitive element (C) 208. $U_1$ represents the input electrical potential and is converted to an electrical current by the first resistive element ($R_1$) 210, and U represents the output electrical potential of the integrator 202.

The electrical circuit 200 can be mathematically represented as shown in EQUATION 3:

$$\frac{d(-u)}{dt} = \frac{u_1(t)}{CR_1} - \frac{-u(t)}{CR_2}, \quad \text{EQUATION 3}$$

where u(t) and $u_1(t)$ are electrical potentials that represent a number of electrons and holes as a function of time, and C, $R_1$ and $R_2$ are capacitance and resistance RC constants that model α and β of EQUATION 2. As noted above, EQUATION 3 is structurally similar to EQUATION 2 and can be used to model the behavior of trapped holes.

FIG. 3 shows an electrical circuit 300, which includes components based on the electrical circuit model 200 of FIG. 2, in connection with the detector pixel 111, the pre-amplifier 112, the shaper 114 and the energy discriminator 118.

In this example, an electrical potential u output by an integrator 302 (which is similar to integrator 202 of the model 200) is transformed to an electrical current through a third resistive element ($R_3$) 301 and then fed back to or injected at the input of the pre-amplifier 112 as the persistent current compensation signal. In addition, a first resistive element ($R_1$) 310 and a second resistive element ($R_2$) 306 of feedback circuit 303, unlike the corresponding resistive elements 210 and 206 of the model 200, are variable resistive elements. In FIG. 3, the resistance values of the first ($R_1$) and second ($R_2$) variable resistive elements 310 and 306, for each detector pixel, is adapted to the behavior of the corresponding conversion material of the detector pixel as the behavior tends to vary from detector pixel to detector pixel.

The values of the electrical elements 302, 306, 308 and/or 310 of each electrical circuit 300 of each detector pixel are tuned to match the actual behavior of the corresponding direct conversion material of the corresponding detector pixel. Various approaches can be employed to achieve this. For example, in one non-limiting instance, the resistive and capacitive values respectively of the electrical elements 301 and 308 are static values, which are based on predetermined circuit design criteria, for all electrical circuits 300 of all detector pixels, and the resistive values of $R_1$ and $R_2$ of each electrical circuit 300 matches the behavior of the direction conversion material of corresponding detector pixel.

For calibrating $R_1$ and $R_2$, the actual mismatch of the actual state of the direct conversion material of a detector pixel and the state of the model is first determined This can be determined by the output pulse of the shaper 114, which will be offset based on the mismatch. The offset can be measured by switching X-rays "off" and injecting known electronic test pulses that have a well-defined peak amplitude into the input of the pre-amplifier 112. A threshold scan can then be used to measure the peak voltage of these pulses.

Generally, for the threshold scan, a level of each of the thresholds 122 of each of the comparators 120 for each of the detector pixels is swept or incrementally increased (or decreased) from a predetermined starting point by a predetermined increment to a predetermined end point and the detected number of counts at each discrete threshold position is used to determine the peak voltage of the pulses. This peak voltage is indicative of a sum of the known pulse peak amplitude and the actual offset (the mismatch) and, thus, the actual offset can be determined by subtracting the sum of the known pulse peak amplitude from the measured peak voltage.

For $R_1$, X-rays are turned "off" for a long enough time to ensure that there are no or minimal trapped holes in the direct conversion material. Then, X-rays are turned "on" for a short period of time, but long enough to generate trapped holes. Then, X-rays are turned "off" and the mismatch is measured, as described above. The mismatch indicates how good the value of $R_1$ follows the holes generation process in the direct conversion material. A positive mismatch indicates an underestimation of the holes generation, and a negative mismatch indicates an overestimation and $R_1$. For a positive mismatch, the value of $R_1$ is decreased, and the calibration is repeated until the mismatch falls within a predetermined range. For a negative mismatch, the value of $R_1$ is increased, and the calibration is repeated until the mismatch falls within the predetermined range.

For $R_2$, X-rays are turned "on" to generate trapped holes. Then, X-rays are turned "off." The slope of the mismatch is then recorded over the lifetime of the holes, which can be measured, as described above. If the results of the mismatch measurements have an increasing trend, the recombination rate is overestimated with the actual value of $R_2$, and $R_2$ is increased. If the results of the mismatch measurements have a decreasing trend, the recombination rate is underestimated with the actual value of $R_2$, and $R_2$ is decreased. $R_2$ is either increased or decreased until the mismatch falls within a predetermined range.

The compensation current may diverge from the actual persistent current due to a mismatch between $R_1$ and $R_2$, noise, a change of the crystal behavior (e.g., temperature) of the direct conversion material, a mismatch of the model, and/or other reasons. In one instance, X-rays are turned "on" and "off" during an acquisition interval so that an actual persistent current can be measured, and the persistent current model parameters can be adapted based thereon.

By way of example, in one instance, X-rays are tuned "off" during a predetermined sub-portion of one or more acquisition intervals, which allows the shaper 114 to adapt to the real persistent current. During such an adaptation period, the variable resistance of the resistive element $R_1$ for each of the detector pixels is adjusted to low values allowing the integrators 3202 to rapidly change its output to compensate for the actual persistent current of the direction conversion material of the detector pixels, and this operating point is used for the next acquisition interval.

In another instance, the direct charge injection via R3 can be implemented by a more complex circuit, for example, using charge mirrors and/or other circuitry.

Calibration of $R_1$ and $R_2$, generally, is repeated, iteratively, until the mismatch falls with a predetermined range.

FIG. 4 illustrate a method for compensating for persistent current generated by direct conversion material of a direct conversion counting detector.

At 402, the pre-amplifier 112 receives a signal produced by a direct conversion detector pixel of a counting detector in response to incident radiation illuminating the detector pixel.

At 404, the persistent current estimator 116 estimates a persistent current, which is produced by the direct conversion material of the detector pixel 111 in response to the incident radiation illuminating the detector pixel 111 and included in the signal received at the pre-amplifier.

At 406, the persistent current estimator 116 injects the estimate at the input of the pre-amplifier 112.

At 408, the injected estimate substantially cancels the persistent current at the input of the pre-amplifier 112.

At 410, the pre-amplifier 112 amplifies the persistent current compensated signal.

At 412, the shaper 114 receives the amplified persistent current compensated signal and generates an electrical pulse having a peak height indicative of an energy level of the incident radiation.

At 414, optionally, other processing electronics are employed to process the electrical pulse to energy-discriminate the incident radiation as discussed herein or otherwise.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A system, comprising:
   a signal shaper that receives an electrical signal generated by a direct conversion detector pixel of an imaging system, wherein the electrical signal is indicative of x-ray radiation detected by the direct conversion detector pixel, and a persistent current compensation signal, and generates an electrical pulse having a peak amplitude that is indicative of an energy level of the detected radiation from on a combination the electrical signal and the persistent current compensation signal;
   a persistent current estimator that generates the persistent current compensation signal based on a persistent current model for the direct conversion detector pixel and an output of the signal shaper and provides the persistent current compensation signal to the signal shaper as a feedback signal;
   an energy-discriminator that energy-discriminates the electrical pulse with a set of comparators, each comparator having a different predetermined energy threshold, wherein each of the comparators compares a height of an incoming pulse with a corresponding threshold, and generates an output signal that indicates whether the peak amplitude exceeds the threshold;
   counter that counts, for each of the comparators, when an individual threshold is exceeded by a peak of a pulse, for each of the plurality of pulses; and
   an energy-binner that bins the counts into energy ranges based on a relationship between the threshold levels and the energy of incoming radiation, energy-resolving the detected radiation.

2. The system of claim 1, further comprising:
   a reconstructor that reconstructs the energy-binned signals with at least one of a spectral reconstruction algorithm or a non-spectral reconstruction algorithm.

3. The system of claim 1, further comprising:
   a pre-amplifier amplifies the electrical signal and the persistent current compensation signal, wherein the signal shaper receives and processes the amplified electrical and persistent current compensation signals.

4. The system of claim 1, wherein the persistent current model models a behavior of the direct conversion material with respect to persistent current.

5. The system of claim 1, wherein the model models a generation of trapped holes in the direct conversion material and a trapped hole recombination rate of the direct conversion material.

6. The system of claim 1, the persistent current estimator, comprising:
   circuitry, which receives and processes the electrical pulse output by the shaper and generates the persistent current compensation signal based thereon.

7. The system of claim 6, the circuitry, comprising:
   a first resistive element that receives the electrical pulse output by the shaper and generates a first output signal indicative of the generation of trapped holes in the direct conversion material.

8. The system of claim 7, wherein the first resistive element has a first resistive value corresponding to the behavior of the direct conversion material with respect to the persistent current.

9. The system of claim 7, the circuitry, further comprising:
   an integrator, including:
      an amplifier; and
      a feedback circuit, including:
         a second resistive element indicative of the trapped hole recombination rate of the direct conversion material; and
         a capacitive element, wherein the second resistive element and the capacitive element are electrically in parallel,
   wherein the integrator receives and integrates the first output signal and generates the persistent current compensation signal based thereon.

10. The system of claim 9, wherein the second resistive element has a second resistive value corresponding to the behavior of the direct conversion material with respect to the persistent current.

11. A method, comprising:
   generating a persistent current compensation signal based on a model of a behavior of a direct conversion material of a photon counting detector pixel of an imaging system;
   routing an electrical signal output by the direct conversion material in response to the direct conversion material detecting radiation to a signal shaper;
   injecting the persistent current compensation signal at an input of the signal shaper; and
   generating, with the signal shaper, an electrical pulse having a peak height that is indicative of an energy level of radiation detected by the direct conversion material.

12. The method of claim 11, further comprising:
   canceling a persistent current introduced into the electrical signal by the direct conversion material with the persistent current compensation signal.

13. The method of claim 11, wherein the persistent current compensation signal has a magnitude on an order of a persistent current introduced into the electrical signal by the direct conversion material and an opposite sign of the persistent current, and further comprising: adding the electrical signal and the persistent current compensation signal, producing a persistent current corrected signal.

14. The method of claim 13, where the signal shaper generates the electrical pulse from the persistent current corrected signal.

15. The method of claim 13, further comprising:
amplifying the persistent current corrected signal, where the signal shaper generates the electrical pulse from the amplified persistent current corrected signal.

16. The method of claim 11, wherein the persistent current compensation signal is generated with an electrical circuit.

17. The method of claim 16, wherein the electrical circuit includes a first resistive element that generates a first output signal, wherein the first resistive element has a first resistive value indicative of the generation of trapped holes in the direct conversion material, and an integrator the integrates the first output signal and generates the persistent current compensation signal, wherein the integrator includes at least a feedback resistive element having a second resistive value indicative of the generation of trapped holes in the direct conversion material.

18. The method of claim 16, wherein the electrical circuit receives an electrical pulse generated by the signal shaper and generates the persistent current compensation signal based thereon.

19. The method of claim 16, further comprising:
generating a different persistent current compensation signal for each of a plurality of photon counting detector pixels of an imaging detector of an imaging system.

20. A persistent current estimator that estimates a persistent current produced by a direct conversion material of a photon counting detector pixel, the persistent current estimator, comprising:
a first resistive element, having a first resistive value indicative of a generation of trapped holes in the direct conversion material, that generates a first output signal; and
an integrator that receives and processes the first output signal, generating a persistent current compensation signal corresponding to the persistent current produced by a direct conversion material.

* * * * *